United States Patent [19]
Asano

[11] Patent Number: 5,591,280
[45] Date of Patent: Jan. 7, 1997

[54] PNEUMATIC TIRE INCLUDING SIPES

[75] Inventor: Kazuo Asano, Hyogo-ken, Japan

[73] Assignee: Sumitomo Rubber Industries, Ltd., Hyogo-ken, Japan

[21] Appl. No.: 382,154

[22] Filed: Feb. 1, 1995

[30] Foreign Application Priority Data

Feb. 2, 1994 [JP] Japan .................................. 6-031786

[51] Int. Cl.$^6$ .................................................. B60C 11/12
[52] U.S. Cl. .................................. 152/209 R; 152/DIG. 3
[58] Field of Search .......................... 152/209 R, 209 D, 152/DIG. 3

[56] References Cited

U.S. PATENT DOCUMENTS

| | | | |
|---|---|---|---|
| 2,708,957 | 5/1955 | Constantakis et al. | 152/DIG. 3 |
| 2,926,715 | 3/1960 | Constantakis | 152/209 R |
| 4,934,424 | 6/1990 | Kojima | 152/209 R |
| 5,109,904 | 5/1992 | Numata et al. | 152/DIG. 3 |
| 5,178,698 | 1/1993 | Shibata | 152/209 R |

FOREIGN PATENT DOCUMENTS

| | | | |
|---|---|---|---|
| 157406 | 7/1986 | Japan | 152/DIG. 3 |
| 292508 | 12/1987 | Japan | 152/209 D |
| 137003 | 6/1988 | Japan | 152/209 D |
| 182502 | 7/1990 | Japan | 152/209 D |
| 179509 | 7/1990 | Japan | 152/209 R |
| 241804 | 9/1990 | Japan | 152/209 R |

*Primary Examiner*—Steven D. Maki
*Attorney, Agent, or Firm*—Birch, Stewart, Kolasch & Birch, LLP

[57] ABSTRACT

A pneumatic tire in which the uneven wear resistance and durability are improved without sacrificing the on-the-snow performances. The tire comprises a tread portion provided with blocks each having a top surface of which the centroid is located within the ground contacting width, each block provided with circumferentially spaced axially extending sipes. In each block, the depths of the sipes gradually increasing from both the circumferential edges of the block toward the circumferential central portion of the block so that at least one deepest sipe exists in the circumferential central portion, and the maximum depth of the deepest sipe being in the range of from 0.6 to 0.9 times the depth of the circumferential grooves. Preferably, the depth of each sipe is gradually decreased from the axially inside to the outside of the tire.

6 Claims, 11 Drawing Sheets

PNEUMATIC TIRE INCLUDING SIPES

The present invention relates to a pneumatic tire, more particularly a studless tire of which the uneven wear resistance and durability are improved without sacrificing the on-the-snow performances.

In recent years, in view of the dust pollution problems, a studless tire is widely used as a snow tire instead of a spike tire.

In the studless tires, in order to improve running performances, such as road grip, on both the snowy roads and icy roads, a low modulus rubber compound which has suppleness at a low temperature is usually used in the tread portion. Such a low modulus rubber compound is however, inferior in the durability and wear resistance.

On the other hand, the tread portion is provided with a block pattern which is superior in the grip performance, and the blocks are provided with sipes, i.e. cuts or narrow slits. Accordingly, the tread blocks made of a low modulus rubber compound are further decreased in the rigidity by the provision of the sipes.

Therefore, such a studless tire is inferior in the tread durability and wear resistance such as heel-and-toe wear in particular when used on a road surface not covered with snow nor ice such as a dry paved road and the like.

It is therefore, an object of the present invention to provide a pneumatic tire in which, by specifically varying the depths of such sipes in a block, the durability and wear resistance are improved without sacrificing the on-the-snow performances.

According to one aspect of the present invention, a pneumatic tire comprises a tread portion provided with circumferential grooves and axial grooves to form blocks, each block having a top surface the centroid of which is located within the ground contacting width of the tread portion under a standard condition in which the tire is mounted on a standard rim, inflated to a standard inner pressure and loaded with a standard load, wherein each of the blocks is provided with circumferentially spaced axially extending sipes of which depths gradually increase from both the circumferential edges of the block toward the circumferential center thereof so that the maximum depth of the deepest sipe is in the range of from 0.6 to 0.9 times the depth of the circumferential grooves.

Accordingly, the sipes in each block become shallower in both the circumferential edges of the block than in the central portion, which increases the rigidity of the block against a bending deformation in the circumferential direction of the tire, and the deformation of the blocks are prevented to increase the grip force to improve snow performance and to decrease uneven wear such as heel-and-toe wear to improve the durability. If the maximum depth of the deepest sipe in each block is less than 0.6 times the circumferential groove depth, snow grip and ice grip are lowered. If the maximum depth is more than 0.9 times, the block rigidity greatly decreases to cause uneven wear.

According to another aspect of the present invention, a pneumatic tire comprises a tread portion provided with circumferential grooves and axial grooves to form blocks, each block having a pair of side edges one of which is located nearer to the tire equator than the other, and each block having a top surface the centroid of which is located within the ground contacting width, wherein each of the blocks is provided with circumferentially spaced axially extending sipes of which depths gradually decrease from the side edge nearer to the tire equator than the other side edge toward the other side edge so that the maximum depth is in the range of from 0.6 to 0.9 times the depth of the circumferential grooves.

Accordingly, the rigidity of the block against a bending deformation in the axial direction is increased, and the deformation of the blocks are prevented to increase the grip during cornering and to decrease uneven wear such as feather edge wear.

Preferably, the total area of the top surfaces of all blocks—whether the sipes are provided or not—of which the top surfaces' centroids are located within the ground contacting width, is set in the range of from 60 to 85% of the total area of the ground contacting width or the total area between the edge lines of the ground contacting region. If the total area is less than 60%, uneven wear is liable to increase if the total area is more than 85%, the drainage and grip performances are decreased.

Embodiments of the present invention will now be explained according to the accompanying drawings.

Figure 1:
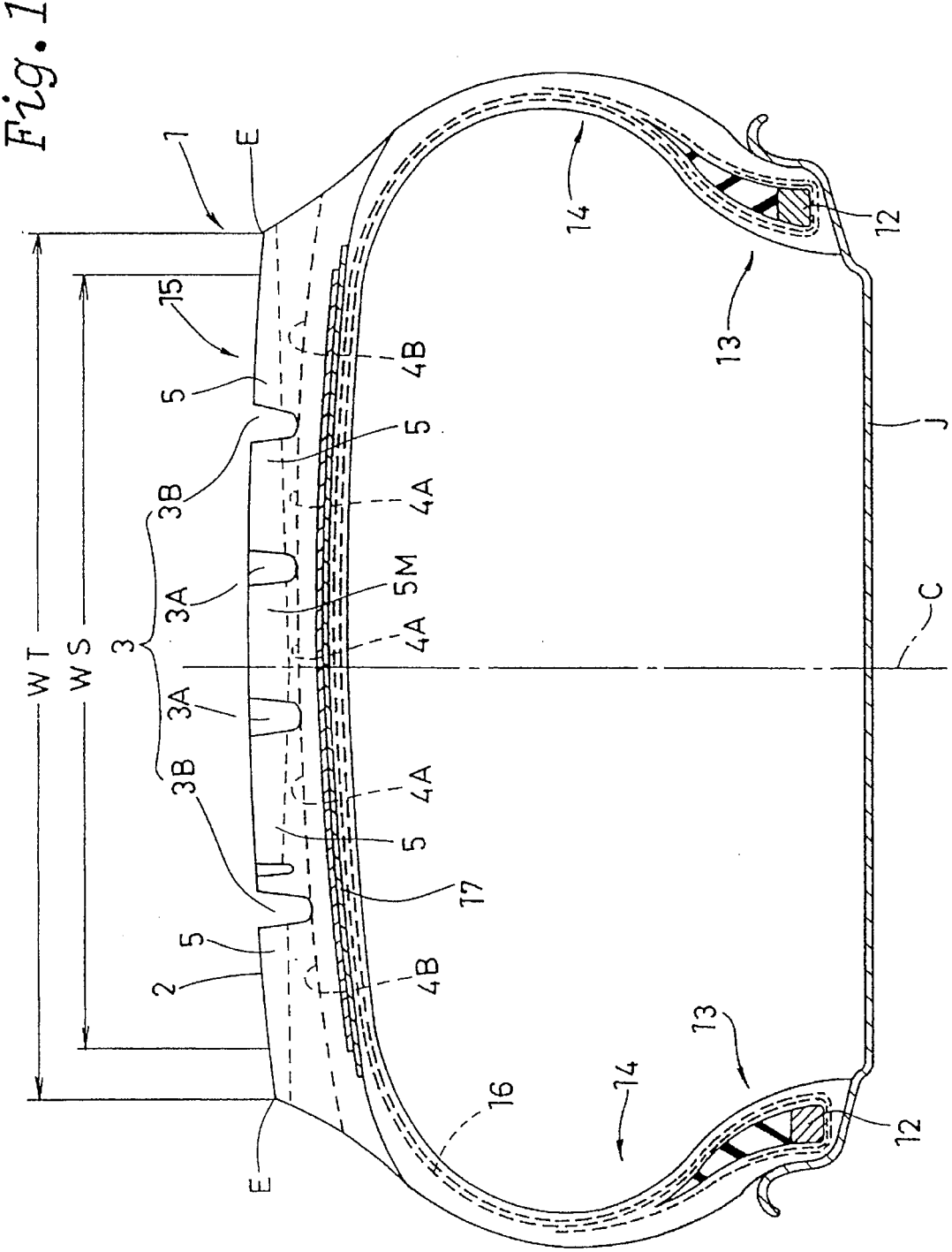
FIG. 1 is a cross sectional view of a tire according to the present invention.

In FIGS. 1–4, the pneumatic tire 1 of the present invention is a studless snow radial tire for passenger cars having a relatively low aspect ratio.

The tire 1 comprises a tread portion 15 defining a tread surface 2, a pair of bead portions 13 with a bead core 12 therein, a pair of sidewall portions 14 extending therebetween, a carcass 16 extended between the bead portions 13 through the tread portion 15 and sidewall portions 14 and turned up around the bead cores 12, and a belt layer 17 disposed radially outside the the carcass 16 and inside the tread portion 15.

The carcass 16 is composed of at least one ply, in this embodiment two plies, of cords arranged at an angle of from 70 to 90 degrees with respect to the tire equator. For the carcass cords, organic fiber cords, e.g. polyester, nylon, rayon and the like and steel cords can be used.

The belt layer 17 in this embodiment comprises two plies of cords laid at an angle of from 0 to 30 degrees with respect to the tire equator C so that the cords in each ply cross the cords in the other ply. For the belt cords, steel cords and/or organic fiber cords, e.g. nylon, polyester, rayon and the like can be used.

The above-mentioned tread portion 15 is provided with the circumferential grooves 3 and axial grooves 4.

The circumferential grooves 3 extend continuously in the tire circumferential direction of the tire and, in this embodiment, include a pair of axially inner grooves 3A and a pair of axially outer grooves 3B.

The axial grooves 4 in this embodiment include a plurality of axially inner grooves 4A extending from one of the circumferentially grooves to the adjacent circumferential groove, and a plurality of axially outer grooves 4B extending from the axially outermost circumferential grooves 3B to the tread edges E. Each of the axial grooves 4 has axial ends opened towards the circumferential groove 3 and/or tread edge E. Thus, the tread portion 15 is divided into a plurality of blocks 5 which defines a block pattern.

The groove width GW1 of the circumferential grooves 3 and the groove width GW2 of the axial grooves 4 are not less than 6 mm and not more than 0.12 times the tread width at the groove top.

By adjusting the groove widths, the total area of the top surfaces of all the blocks is set in the range of from 60 to 85% of the total apparent ground contacting area of the tread. Land/(Sea+Land)=0.60 to 0.85.

The groove depth GD1 of the circumferential grooves 3 and the groove depth GD2 of the axial grooves 4 are not less than 10 mm and not more than 0.16 times the tread width. In this embodiment, the groove depth GD1 is the same as the groove depth GD2. However, they may be differed from each other.

If the groove depths GD1 and GD2 are less than 10 mm and/or the groove widths GW1 and GW2 are less than 6 mm, on-the-snow performances, especially snow grip performance are decreased.

As shown in FIG. 4(A) and (B), the side walls 23 of the circumferential groove 3 and the side walls 24 of the axial groove 4 are inclined at an angle θ1, θ2 of from 10 to 15 degrees to the normal direction (N) to the tread surface so that the groove width increases radially outwardly from the groove bottom and the block has a shape of a pyramid frustum.

Further, as shown in FIG. 4(C), the side walls 23 and/or 24 can be inclined with a double inclination, wherein the angle θu of the side wall upper portion is larger than the angle θd of the side wall lower portion, the deference θu−θd therebetween is not less than 5 degrees, and the angles θu and θd are in the range of 10 to 15 degrees, whereby, in the new tire state in which the block rigidity is relatively low, the deformation of the block can be reduced and uneven wear is prevented. In the last tread wear life, the block becomes liable to deform and the snow/ice grip is maintained. Preferably, both the side walls 23 and 24 are inclined with a double inclination so that the block has a shape of a double pyramid frustum.

If the inclination angle θ1, θ2, θu, θd is less than 10 degrees, uneven wear is liable to occur. If the angle is more than 15 degrees, the grip force is decreased and on-the-snow running performance and cornering performance are deteriorated.

According to the invention, some or all the above-mentioned blocks 5 of which the top surface's centroid is located within the ground contacting width (WS) are each provided with a plurality of sipes 6. (Hereinafter, the sipes 6 in one block 5 are called as sipe group 6G.) Here, the ground contacting width (WS) is the maximum axial width between the axial edges of the ground contacting region of the tread under a standard loaded condition. The standard loaded condition is such that the tire I is mounted on a standard rim J and inflated to a standard inner pressure and then loaded with a standard load.

Figure 2:
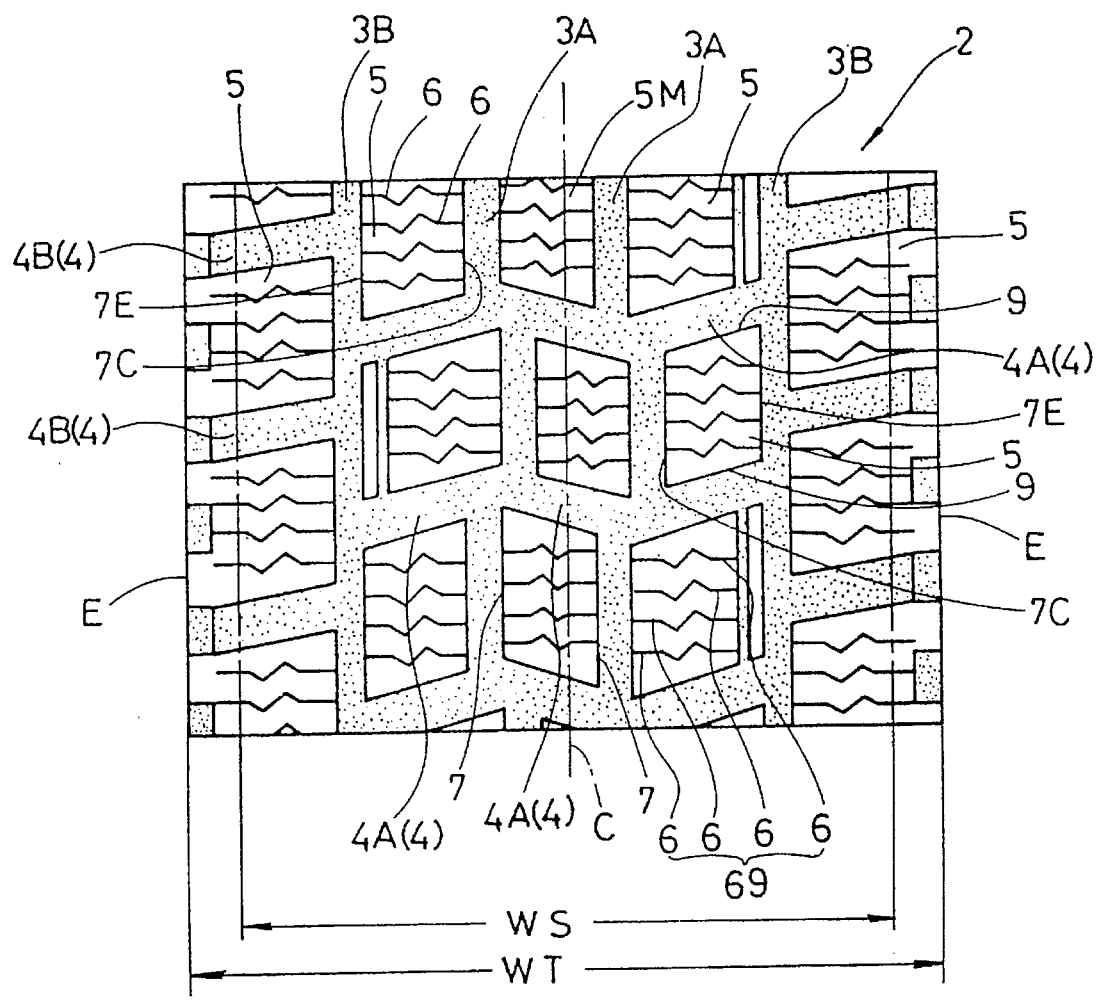
FIG. 2 is a plan view thereof showing an example of the tread pattern.
Figure 3:
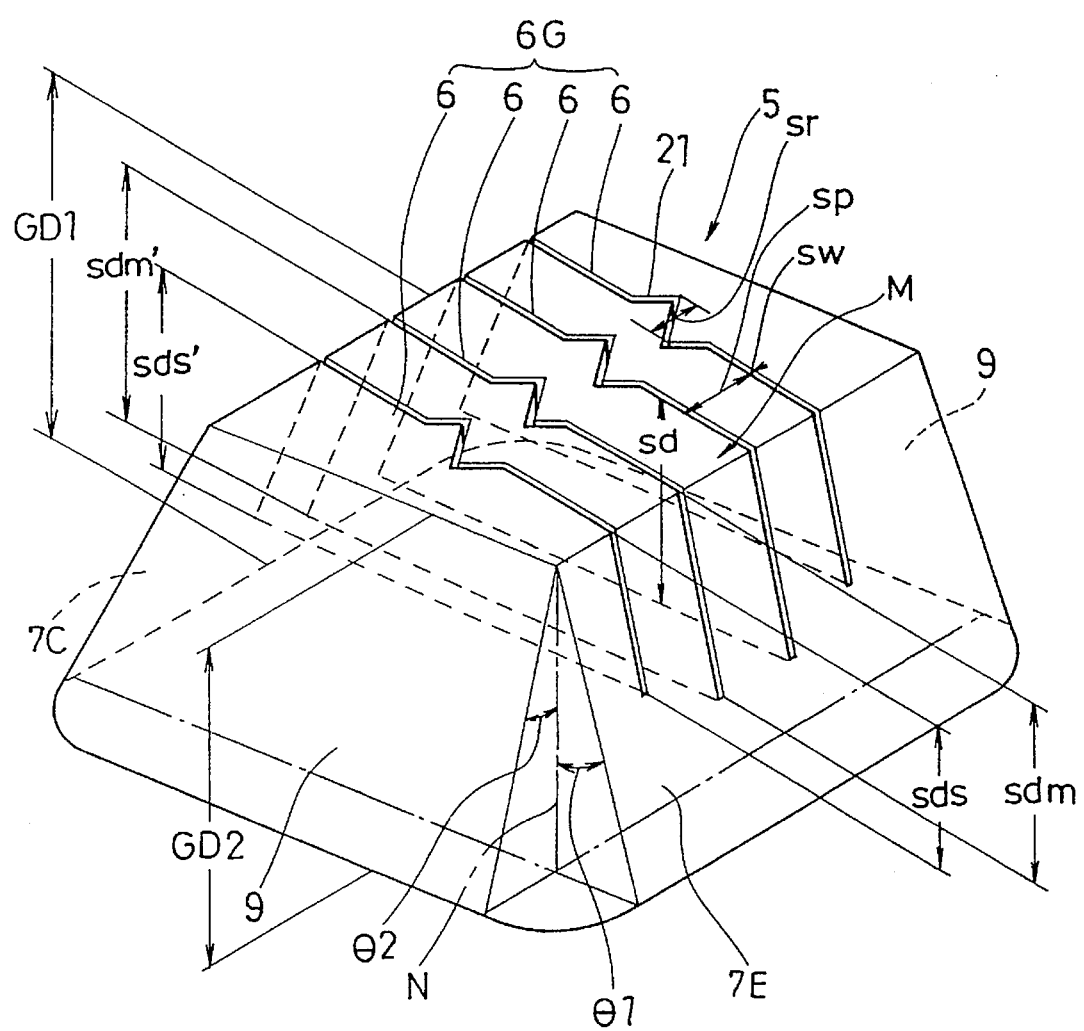
FIG. 3 is a perspective view showing an example of the tread block.
Figure 4:
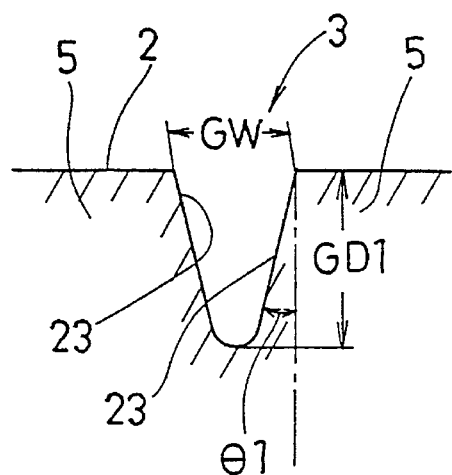
FIG. 4(A) is a cross sectional view of a circumferential groove taken along a straight line at a right angle to the groove bottom line.
FIG. 4(B) is a cross sectional view of an axial groove taken along a straight line at a right angle to the groove bottom line.
FIG. 4(C) is a cross sectional view of a groove taken along a straight line at a right angle to the groove bottom line.
Figure 4:
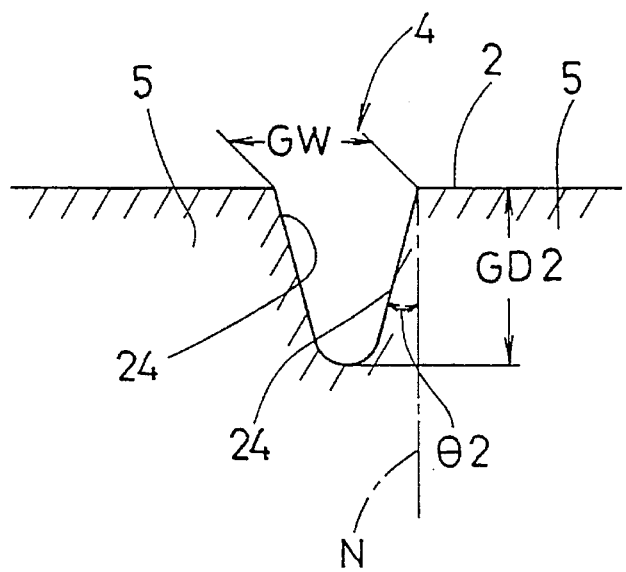
Figure 4:
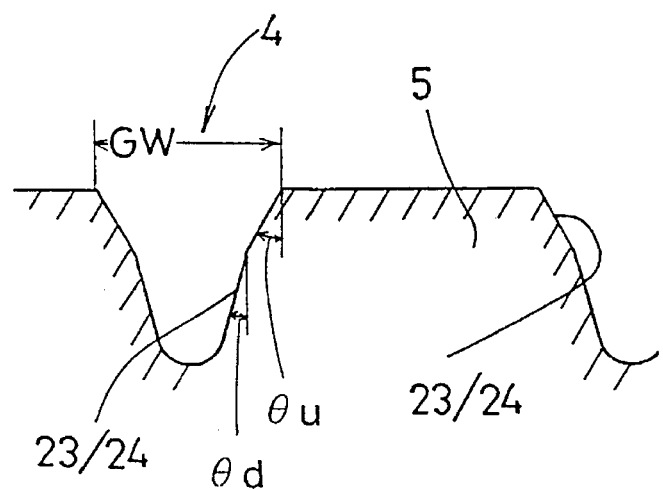
Figure 5:
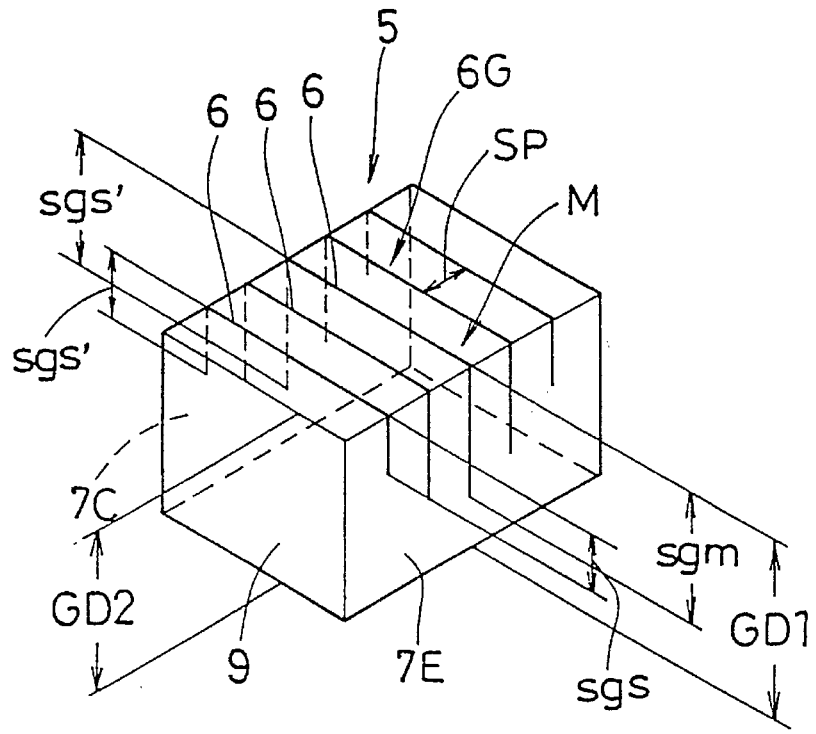
FIG. 5–FIG. 11 are perspective views each showing another example of the block and sipes.
Figure 5:
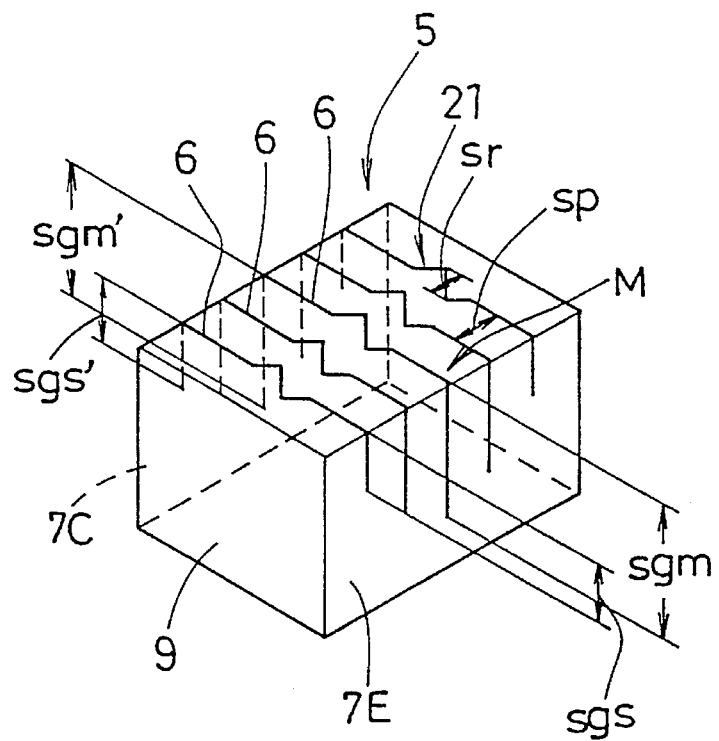

In the embodiment shown in FIG. 2, the centroids of the top surfaces of all the blocks are located within the ground contacting width, and all the blocks are provided with sipes. However, it may be possible to dispose the sipes in only such sipes which are more liable to wear unevenly than others.

A sipe group 8G in this embodiment includes four sipes 6. In other words, four sipes 6 are provided in one block 5.

In a sipe group 6G, the sipes 6 extend generally in the axial direction of the tire in parallel with each other with the substantially same spacings. For the sipe, a straight configuration and a zigzag or wavy configuration can be employed.

The width (sw) of the sipes 6 is preferably set in the range of from 0.5 to 1.5 mm.

As shown in FIG. 2, each sipe 6 in this embodiment is a hybrid of a straight configuration and a zigzag configuration, and it is provided with a zigzag central part 21 between straight end parts. Preferably, the amplitude (Sr) of the zigzag is 0.5 to 1.0 times the spacing (sp) between the adjacent sipes 6. By the provision of the zigzag part 21, the total length of the sipe is increased, and the grip force during straight running is increased. Further, when the block is subjected to a sharing stress during cornering, as the divided block parts are engaged with each other, the axial block rigidity is increased to improve cornering performances such as a sideslip resistance. If the zigzag amplitude is less than 0.5 times, the axial block rigidity can not be increased. If the zigzag amplitude is more than 1.0 times, the rigidity of the block part between the adjacent zigzag parts 21 is decreased, and uneven wear is liable to occur.

In the center blocks 5 formed between the inner circumferential grooves 3A and the middle blocks 5 formed between the inner and outer circumferential grooves 3A and 3B, the sipes 6 extend across the whole width of the block from one side edge 7C to the other side edge 7E. The sipes are therefore, opened at both the ends.

In the shoulder blocks 5 formed axially outward of the outer circumferential grooves 3B, the sipes 6 extend axially outward from the axially inner side edge of the block beyond the ground contacting region's edges, but terminated within the block. Thus, the sipes are opened at one end and closed at the other end.

However, in the central blocks and middle blocks, a sipe with one opened end and one closed end and a sipe with two closed ends (not shown) can be used. Further, in the shoulder blocks, a sipe with two opened ends and a sipe with two closed ends can be used. In general, a sipe with two open ends is preferably used in view of the on-the-snow performances.

According to one aspect of the present invention, the depths (sd) of the sipes 6 in a sipe group 6G are gradually increased from both the circumferential edges 9 toward the circumferential center M of the block. Further, the maximum depth (sdm) of the deepest sipe 6 located in the block center (in FIG. 2, two central sipes) is set in the range of from 0.6 to 0.9 times the depth GD of the circumferential grooves 3. Preferably, the depth (sds) of the sipes 6 located in the block circumferential edges is set in the range of 0.3 to 0.7 times the above-mentioned maximum groove depth (sdm). If sds/sdm is less than 0.3, the snow/ice grip becomes insufficient. If sds/sdm is more than 0.7, a heel-and-toe wear sometimes occurs.

Figure 12:
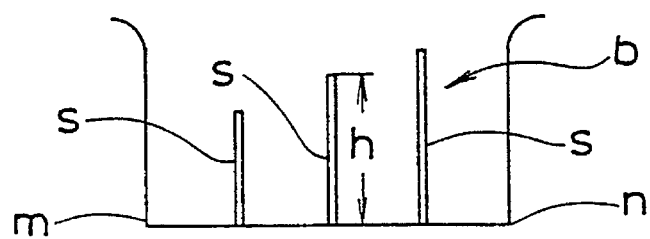
FIG. 12(a, b, c) are diagrams for explaining the heel-and-toe wear.
Figure 12:
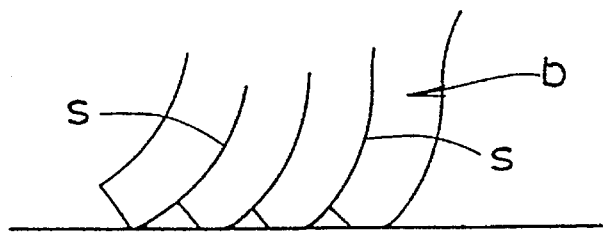
Figure 12:
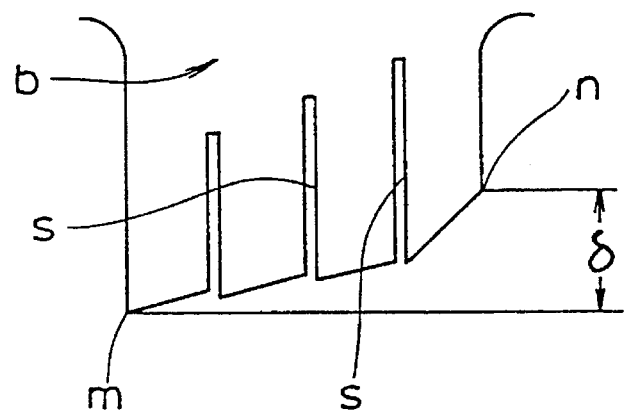

If, as shown in FIG. 12(a), the depths (h) of the sipes (s) are increased from one circumferential edge (m) to the other edge (n), the divided block (b) is deformed easier in a certain direction than in the other direction as shown in FIG. 12(b), and the edge (n) on the deep sipe side is wears more than the other edge (m) as shown in FIG. 12(c). However, in the block according to the invention, as the deep sipe is disposed in the block center than the edge portion, such a large deformation as shown in FIG. 12(b) can be prevented. As a result, the heel-and-toe wear (uneven wear δ) is decreased.

According to another aspect of the present invention, the depth of each sipe is gradually decreased from the tire equator C toward the tread edges.

In this embodiment, in the middle blocks and shoulder blocks, the depth (sd) of each sipe 6 is gradually decreased from the axially inner side edge 7C to the axially outer side edge 7E.

Preferably, the depth (sde) at the axially outer end of the sipe at the side edge 7E is 0.5 to 0.8 times the depth (sdc) at the axially inner end of the sipe at the side edge 7C. If sde/sdc is less than 0.5, the snow/ice grip becomes insufficient. If sde/sdc is more than 0.8, a feather edge wear is liable to occur during cornering.

On the contrary, if the depth (sd) is increased from the axially inner side edge 7C to the axially outer side edge 7E, as the axially outer side edge portion of the block is subjected to a large deformation during cornering, this portion is further deformed than the axially inner edge portion, and the above-mentioned feather edge wear is caused.

Further, in the central blocks on the tire equator C, the depth of each sipe 6 is gradually decreased from the tire equator C towards both the side edges.

FIGS. 5–11 show various examples of the block 5.

Figure 6:
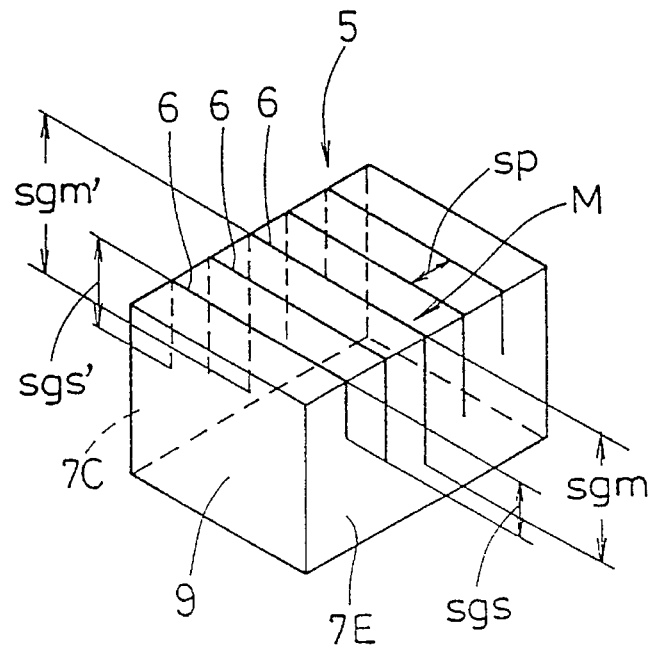
Figure 7A:
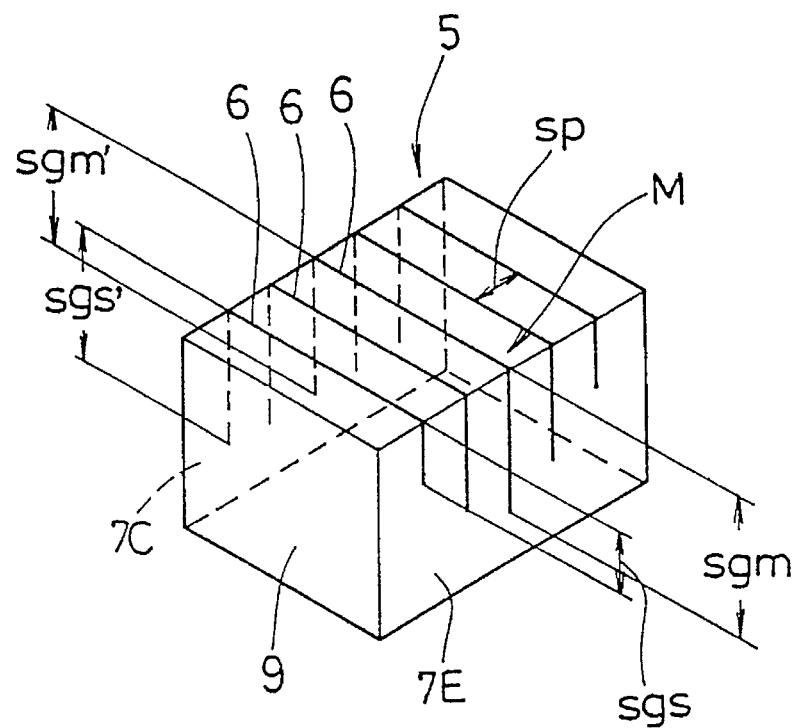

When the depths of the sipes are gradually increased from both the circumferential edges 9 toward the circumferential center M of the block as explained above, the sipes 6 may be a straight sipe extending from one side edge 7C to the other 7E as shown in FIG. 5(A), FIG. 6 and FIG. 7(A). Further, the depth at the axially inner end may be the same as the depth at the axially other end as shown in FIG. 5(A) and (B). Furthermore, the depth at the axially inner end may be differed from the depth at the axially outer end as shown in FIG. 6. Still furthermore, as shown in FIG. 7(A) and (B), the depths of the sipes may be constant at one side edge 7E, while the depths at the other side edge 7C are are varied.

Figure 8:
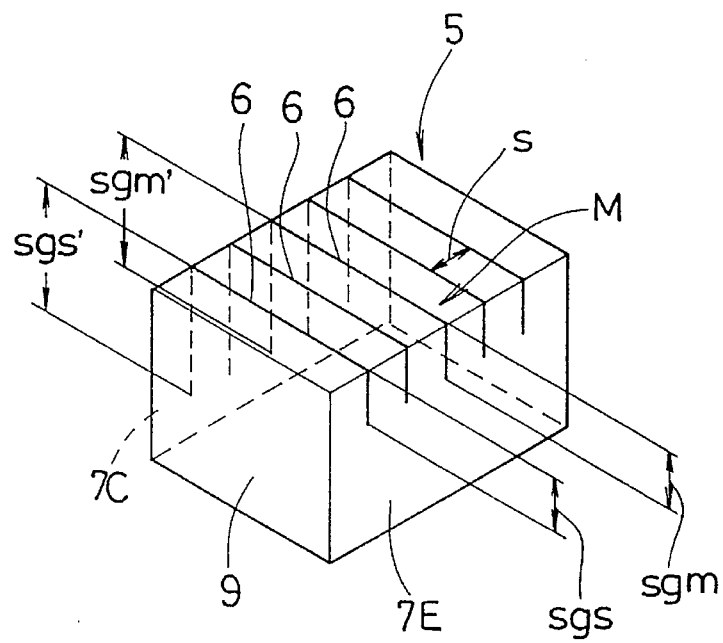

When the depths of the sipes are gradually decreased from the axially inner side edge 7C to the axially outer side edge 7E, as shown in FIG. 8, it may be possible not to change the depths from both the circumferential edges toward the center M of the block, that is, the depths may be constant in the circumferential direction.

On the other hand, it may be possible that the sidewalls of the block 5 are not inclined as shown in FIG. 5 to FIG. 8.

Figure 9:
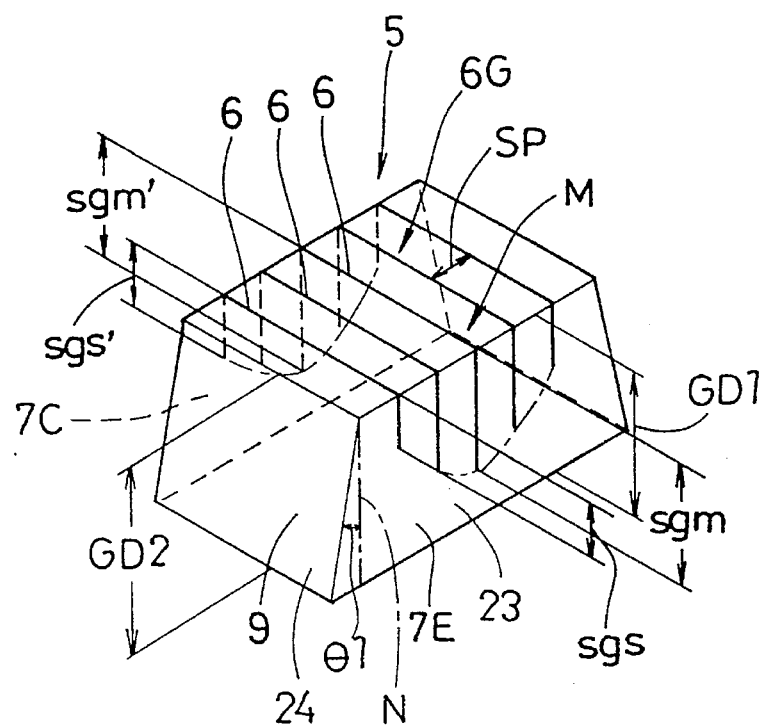
Figure 10:
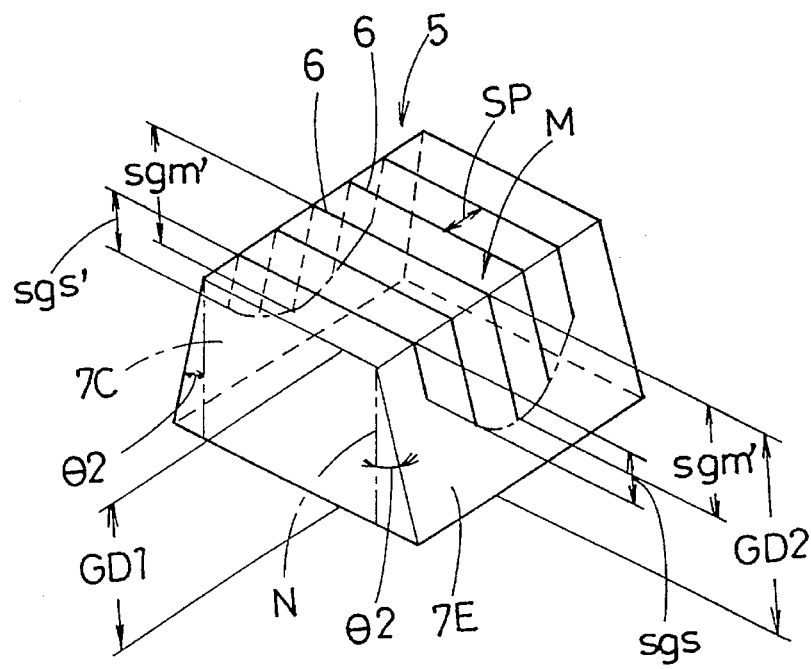
Figure 11:
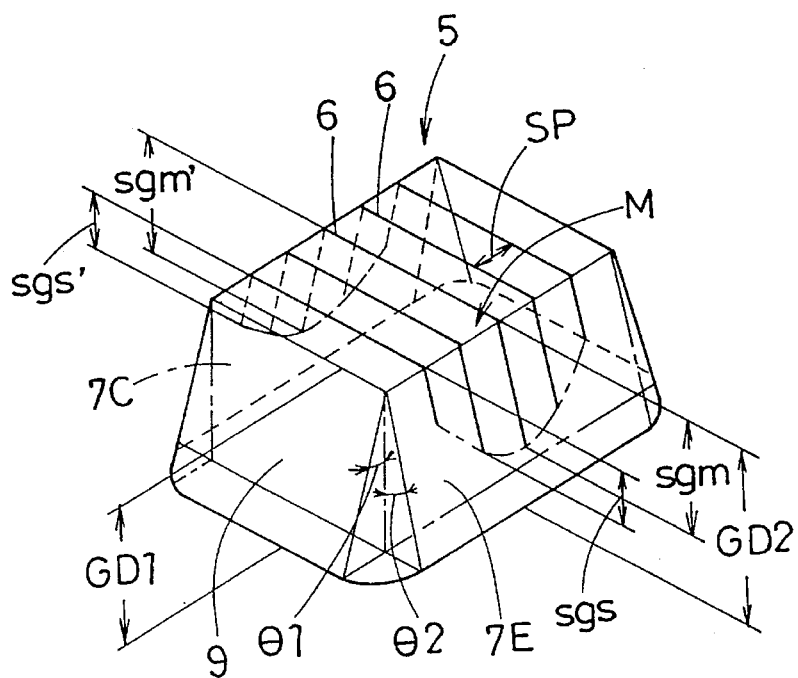

However, the sidewalls are preferably inclined as shown in FIG. 9 to FIG. 11.

In FIG. 9, only the sidewalls 24 facing the axial grooves are inclined at an angle of 10 to 15 degrees with respect to the normal line (N) to the tread surface 2, whereby an excessive circumferential deformation of the block 6 can be decreased and uneven wear caused during straight running can be decreased.

In FIG. 10, only the sidewalls 23 facing the circumferential grooves are inclined at an angle of 10 to 15 degrees with respect to the normal line (N) to the tread surface 2, whereby an excessive axial deformation of the block 6 can be decreased and uneven wear caused during cornering can be decreased, and the resistance to sideslip can be increased.

In FIG. 11, all the sidewalls are inclined at an angle of 10 to 15 degrees with respect to the normal line to the tread surface, whereby an excessive deformation of the block 6 can be decreased to decrease uneven wear, and straight running performance and cornering performance can be improved.

As explained above, it is possible to apply the circumferential depth change and axial depth change, either alone or in combination, to all or some of the blocks which is provided with sipes.

Comparison Test

Test tires having a tire size of 165SR13, the internal structure shown in FIG. 1, the tread pattern shown in FIG. 2, and the specifications shown in Table 1 were prepared and tested as follows.
1) Coefficient of friction—Slip characteristic (μ-s characteristic )

Figure 14:
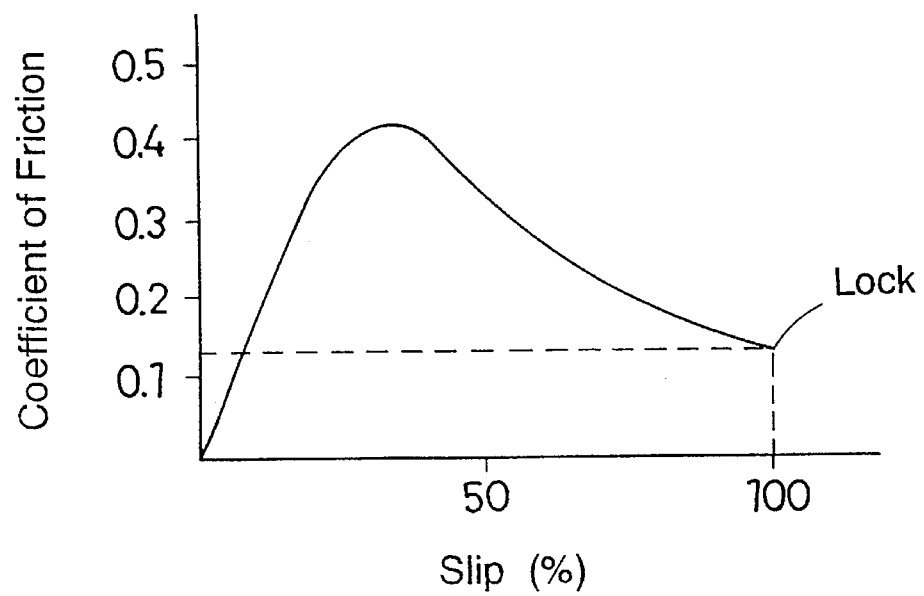
FIG. 14 is a graph showing a friction coefficient-slip characteristic curve.
Figure 13:
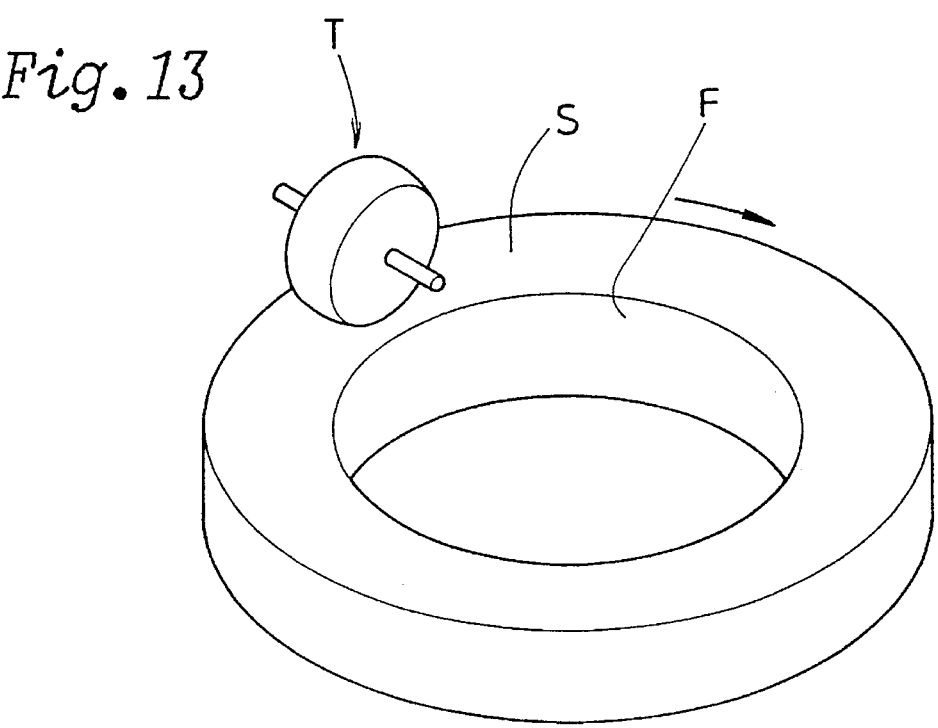
FIG. 13 is a schematic perspective view for explaining the method of measuring the friction coefficient-slip characteristic.

As shown in FIG. 13, the test tire T was run on a rotating disk F covered with the compressed snow S to obtain the coefficient of friction—slip characteristic curve shown in FIG. 14. The running speed was 40 kilometer/hour, the tire pressure was 1.9 kg/cm² and the tire load was 340 kg. Then, the lock μ which is the the coefficient of friction when the tire is locked and slipped 100%, was measured and indicated in Table 1 by an index based on that the prior art tire is 100. The larger index is better.
2) Uneven wear The test tires were mounted on the front wheels of a 4WD car and run for 300 kilometers in a test course, changing the running speed between 90 km/h and 50 km/h every 1.5 kilometers. Then, the amount of wear was measured at both the circumferential edges of the block to obtain the difference δ therebetween, and the difference is indicated in Table 1 by an index based on that the prior art tire is 100. The larger the index, the smaller the uneven wear.

Through the tests the following were confirmed.
(1) Example tires 1 to 5 were improved in the uneven wear resistance when compared with the prior art tire. However, in view of the lock μ, the Example tires 2–4 of which the sds/sdm ratio and sds'/sdm' ratio were in the range of 0.3 to 0.7 were preferred.
(2) Example tires 6 to 10 were improved in the uneven wear resistance when compared with the prior art tire. However, in view of the lock μ, the Example tires 7–9 of which the sds/sdm ratio and sds'/sdm' ratio were in the range of 0.5 to 0.8 were preferred.

Further, when compared Ex. 3 with Ex. 13, and Ex. 11 with Ex. 14, it was confirmed that
(3) Example tires 13 and 14 with the zigzag sipes are superior in the wear resistance to Example tires 3 and 11 with the straight sipes.

Furthermore, when compared Ex. 1 (θ1=0 and θ2=0) with Ex. 15 to 18 (θ1>0 and θ2=0), Ex. 19 to 21(θ1=0 and θ2>0) and Ex. 22 (θ1>0 and θ2>0), it was confirmed that
(4) with regard to the uneven wear resistance, (θ1>0 and θ2>0) is better than (θ1>0 and θ2=0) which is better than (θ1=0 and θ2>0), wherein the wear resistance becomes better as the angles θ1 and θ2 increase, but if the angles θ1 and θ2 are excessively increased, the lock μ decreases.

As described above, in the pneumatic tires according to the present invention, the uneven wear can be decreased to improve the durability, while maintaining or improving the snow performance.

TABLE 1

Figure 15:
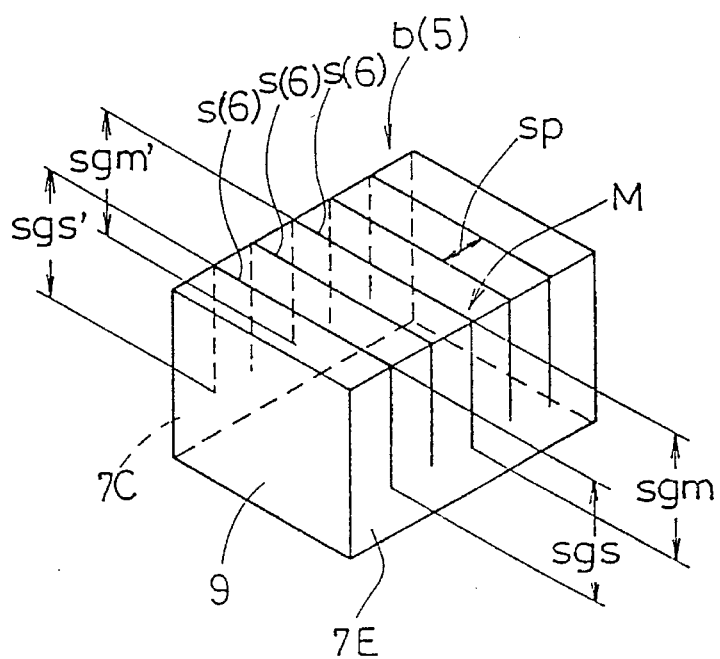
FIG. 15 is a perspective view showing a prior art.

| Tire<br>Block & Sipe | | Prior<br>FIG. 15 | Ex. 1<br>FIG. 5(A) | Ex. 2<br>FIG. 5(A) | Ex. 3<br>FIG. 5(A) | Ex. 4<br>FIG. 5(A) | Ex. 5<br>FIG. 5(A) | Ex. 6<br>FIG. 8 | Ex. 7<br>FIG. 8 |
|---|---|---|---|---|---|---|---|---|---|
| Circum. groove depth | (mm) | 12 | 12 | 12 | 12 | 12 | 12 | 12 | 12 |
| Axial groove depth | (mm) | 12 | 12 | 12 | 12 | 12 | 12 | 12 | 12 |
| Block | | | | | | | | | |
| Sidewall angle $\theta_1$ | (deg) | 0 | 0 | 0 | 0 | 0 | 0 | 0 | 0 |
| Sidewall angle $\theta_2$ | (deg) | 0 | 0 | 0 | 0 | 0 | 0 | 0 | 0 |
| Sipe | | | | | | | | | |
| Depth | | | | | | | | | |
| sdm' | (mm) | 9 | 9 | 9 | 9 | 9 | 9 | 9 | 9 |
| sds' | (mm) | 9 | 1.5 | 3 | 4.5 | 6 | 7.5 | 9 | 9 |
| Ratio sds'/sdm' | | 1 | 0.17 | 0.33 | 0.5 | 0.67 | 0.83 | 1 | 1 |
| Depth | | | | | | | | | |
| sdm | (mm) | 9 | 9 | 9 | 9 | 9 | 9 | 4 | 5 |
| sds | (mm) | 9 | 1.5 | 3 | 4.5 | 6 | 7.5 | 4 | 5 |
| Ratio sds/sdm | | 1 | 0.17 | 0.33 | 0.5 | 0.67 | 0.83 | 1 | 1 |
| (sdm + sds)/(sdm' + sds') | | 1 | 1 | 1 | 1 | 1 | 1 | 0.44 | 0.57 |
| Zigzag amplitude | sr (mm) | — | — | — | — | — | — | — | — |
| Sipe spacing | sp (mm) | 4.8 | 4.8 | 4.8 | 4.8 | 4.8 | 4.8 | 4.8 | 4.8 |
| Ratio sr/sp | | — | — | — | — | — | — | — | — |
| Test Result | | | | | | | | | |
| Lock μ | (index) | 100 | 96 | 99 | 100 | 100 | 100 | 97 | 99 |
| Uneven wear | (index) | 100 | 115 | 112 | 105 | 103 | 100 | 110 | 109 |

Figure 7B:
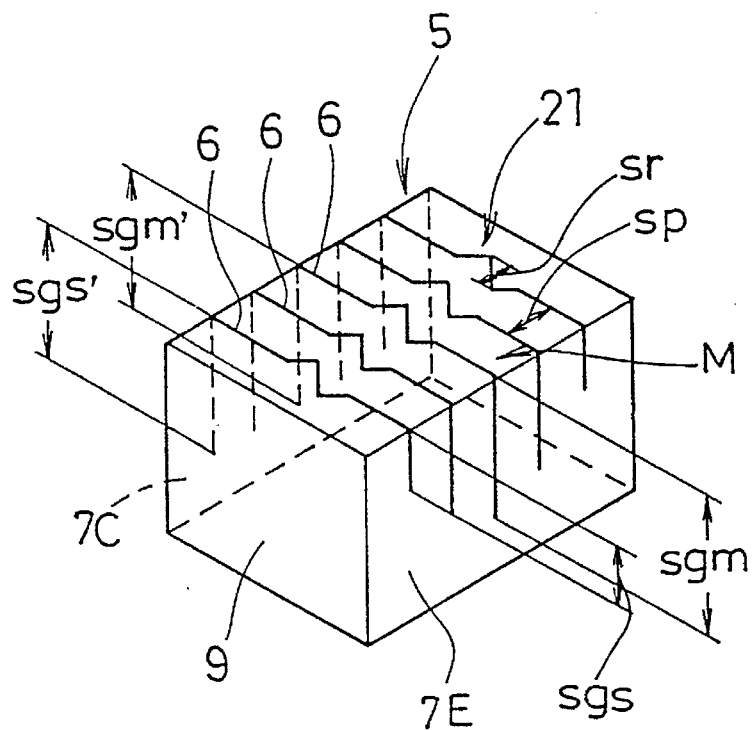

| Tire<br>Block & Sipe | | Ex. 8<br>FIG. 8 | Ex. 9<br>FIG. 8 | Ex. 10<br>FIG. 8 | Ex. 11<br>FIG. 7(A) | Ref. 1<br>FIG. 7(A) | Ex. 12<br>FIG. 6 | Ref. 2<br>FIG. 6 | Ex. 13<br>FIG. 5(B) | Ex. 14<br>FIG. 7(B) |
|---|---|---|---|---|---|---|---|---|---|---|
| Circum. groove depth | (mm) | 12 | 12 | 12 | 12 | 12 | 12 | 12 | 12 | 12 |
| Axial groove depth | (mm) | 12 | 12 | 12 | 12 | 12 | 12 | 12 | 12 | 12 |
| Block | | | | | | | | | | |
| Sidewall angle $\theta_1$ | (deg) | 0 | 0 | 0 | 0 | 0 | 0 | 0 | 0 | 0 |
| Sidewall angle $\theta_2$ | (deg) | 0 | 0 | 0 | 0 | 0 | 0 | 0 | 0 | 0 |
| Sipe | | | | | | | | | | |
| Depth | | | | | | | | | | |
| sdm' | (mm) | 9 | 9 | 9 | 9 | 9 | 9 | 6 | 9 | 9 |
| sds' | (mm) | 9 | 9 | 9 | 9 | 4.5 | 6 | 3 | 4.5 | 9 |
| Ratio sds'/sdm' | | 1 | 1 | 1 | 1 | 0.5 | 0.67 | 0.5 | 0.5 | 1 |
| Depth | | | | | | | | | | |
| sdm | (mm) | 6 | 7 | 8 | 9 | 9 | 6 | 9 | 9 | 9 |
| sds | (mm) | 6 | 7 | 8 | 4.5 | 9 | 3 | 6 | 4.5 | 4.5 |
| Ratio sds/sdm | | 1 | 1 | 1 | 0.5 | 1 | 0.5 | 0.67 | 0.5 | 0.5 |
| (sdm + sds)/(sdm' + sds') | | 0.67 | 0.78 | 0.89 | 0.75 | 1.33 | 0.6 | 1.67 | 1 | 0.75 |
| Zigzag amplitude | sr (mm) | — | — | — | — | — | — | — | 3.0 | 3.0 |
| Sipe spacing | sp (mm) | 4.8 | 4.8 | 4.8 | 4.8 | 4.8 | 4.8 | 4.8 | 4.8 | 4.8 |
| Ratio sr/sp | | — | — | — | — | — | — | — | 0.625 | 0.625 |
| Test Result | | | | | | | | | | |
| Lock μ | (index) | 100 | 100 | 100 | 100 | 100 | 100 | 100 | 100 | 100 |
| Uneven wear | (index) | 106 | 103 | 101 | 108 | 105 | 109 | 105 | 107 | 110 |

| Tire<br>Block & Sipe | | Ex. 15<br>FIG. 9 | Ex. 16<br>FIG. 9 | Ex. 17<br>FIG. 9 | Ex. 18<br>FIG. 9 | Ex. 19<br>FIG. 10 | Ex. 20<br>FIG. 10 | Ex. 21<br>FIG. 10 | Ex. 22<br>FIG. 11 |
|---|---|---|---|---|---|---|---|---|---|
| Circum. groove depth | (mm) | 12 | 12 | 12 | 12 | 12 | 12 | 12 | 12 |
| Axial groove depth | (mm) | 12 | 12 | 12 | 12 | 12 | 11 | 8 | 12 |
| Block | | | | | | | | | |
| Sidewall angle $\theta_1$ | (deg) | 10 | 15 | 20 | 25 | 0 | 0 | 0 | 10 |
| Sidewall angle $\theta_2$ | (deg) | 0 | 0 | 0 | 0 | 10 | 15 | 20 | 10 |
| Sipe | | | | | | | | | |
| Depth | | | | | | | | | |
| sdm' | (mm) | 9 | 9 | 9 | 9 | 9 | 9 | 9 | 9 |
| sds' | (mm) | 1.5 | 1.5 | 1.5 | 1.5 | 1.5 | 1.5 | 1.5 | 1.5 |
| Ratio sds'/sdm' | | 0.17 | 0.17 | 0.17 | 0.17 | 0.17 | 0.17 | 0.17 | 0.17 |
| Depth | | | | | | | | | |
| sdm | (mm) | 9 | 9 | 9 | 9 | 9 | 9 | 9 | 9 |

TABLE 1-continued

|  |  |  |  |  |  |  |  |  |  |
|---|---|---|---|---|---|---|---|---|---|
| sds | (mm) | 1.5 | 1.5 | 1.5 | 1.5 | 1.5 | 1.5 | 1.5 | 1.5 |
| Ratio sds/sdm |  | 0.17 | 0.17 | 0.17 | 0.17 | 0.17 | 0.17 | 0.17 | 0.17 |
| (sdm + sds)/(sdm' + sds') |  | 1 | 1 | 1 | 1 | 1 | 1 | 1 | 1 |
| Zigzag amplitude | sr (mm) | — | — | — | — | — | — | — | — |
| Sipe spacing | sp (mm) | 4.8 | 4.8 | 4.8 | 4.8 | 4.8 | 4.8 | 4.8 | 4.8 |
| Ratio sr/sp |  | — | — | — | — | — | — | — | — |
| Test Result |  |  |  |  |  |  |  |  |  |
| Lock μ | (index) | 100 | 100 | 100 | 99 | 100 | 100 | 99 | 100 |
| Uneven wear | (index) | 130 | 132 | 133 | 150 | 120 | 120 | 125 | 140 |

I claim:

1. A pneumatic tire comprising a tread portion, said tread portion provided with circumferential grooves and axial grooves to form blocks each having a top surface of which the centroid is located within the ground contacting width of the tread portion, each said block provided with circumferentially spaced axially extending sipes, each said sipe having an axially inner open end and an axially outer open end, wherein, in each said block, the depths of the sipes at their axially inner open ends are the same, but the depths at their axially outer open ends are gradually increased from both the circumferential edges of the block toward a circumferential central portion of the block so that at least one sipe, which has the deepest axially outer open end, exists in the circumferential central portion, and the sipes gradually decreased in depth from the axially inner open end to the axially outer open end, excepting said at least one sipe which has the deepest axially outer open end, and the maximum depth of the sipes being in the range of from 0.6 to 0.9 times the depth of the circumferential grooves.

2. The tire according to claim 1, wherein the total area of the top surfaces of all blocks of which top surfaces of the centroids are located within the ground contacting width, inclusive of said blocks, is in the range of from 60 to 85% of the total area of the ground contacting width.

3. The tire according to claim 1, wherein the side walls of the circumferential grooves are inclined with a double inclination such that the angle of the side wall upper portion is larger than the angle of the side wall lower portion, and the difference therebetween is not less than 5 degrees.

4. The tire according to claim 3, wherein the angles of the upper and lower portions of the side walls are in the range of 10 to 15 degrees.

5. The tire according to claim 1, wherein the side walls of the axial grooves are inclined with a double inclination such that the angle of the side wall upper portion is larger than the angle of the side wall lower portion, and the difference therebetween is not less than 5 degrees.

6. The tire according to claim 5, wherein the angles of the upper and lower portions of the side walls are in the range of 10 to 15 degrees.

* * * * *